(12) United States Patent
Quach

(10) Patent No.: US 7,564,466 B2
(45) Date of Patent: Jul. 21, 2009

(54) SYSTEM AND METHOD FOR MANAGING MEMORY FOR COLOR TRANSFORMS

(75) Inventor: Tony Quach, Anaheim, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 692 days.

(21) Appl. No.: 11/328,571

(22) Filed: Jan. 10, 2006

(65) Prior Publication Data

US 2007/0159494 A1    Jul. 12, 2007

(51) Int. Cl.
*G09G 5/00* (2006.01)

(52) U.S. Cl. ............... 345/601; 345/471; 345/549; 345/557; 345/589; 345/600; 358/523; 358/524

(58) Field of Classification Search ............... None
See application file for complete search history.

(56) References Cited

U.S. PATENT DOCUMENTS

| | | | |
|---|---|---|---|
| 5,847,692 A * | 12/1998 | Ono | ............... 345/601 |
| 6,061,749 A | 5/2000 | Webb et al. | |
| 6,075,514 A | 6/2000 | Ryan | |
| 6,246,396 B1 | 6/2001 | Gibson et al. | |
| 6,380,945 B1 | 4/2002 | MacInnis et al. | |
| 6,642,931 B1 | 11/2003 | Haikin et al. | |
| 6,693,643 B1 | 2/2004 | Trivedi et al. | |
| 6,819,330 B2 | 11/2004 | MacInnis et al. | |
| 6,897,877 B2 | 5/2005 | Marion et al. | |
| 2003/0214511 A1 | 11/2003 | Marion et al. | |
| 2005/0206651 A1 | 9/2005 | Sawada et al. | |

* cited by examiner

*Primary Examiner*—Antonio A Caschera
(74) *Attorney, Agent, or Firm*—Tucker Ellis & West LLP

(57) ABSTRACT

A system and method for managing memory for color transforms. Color input data representing a colorized electronic document is first received by a color management module and analyzed. The color transformations required to complete processing of the color document is then determined. A plurality of lookup tables are then generated in system memory in accordance with the determined color transformations specified by the analysis of the color input data. A counter, corresponding to a lookup table for each request for a related color transform is then selectively incremented and decremented, based upon the output and determinations of the color management module. The color management module then selectively clears a lookup tables in the associated system memory when a corresponding counter value has been decremented to a selected level.

14 Claims, 3 Drawing Sheets

SYSTEM AND METHOD FOR MANAGING MEMORY FOR COLOR TRANSFORMS

BACKGROUND OF THE INVENTION

This invention is directed to a system and method for managing memory for color transforms, particularly as applied to digital imaging devices. In particular, the system and method. of the present invention reduce the amount of memory required for transfer functions, under color removal, and black generation. The system and method of the present invention reduce the memory usage for color transforms by using a lookup table having an associated reference counter and a function cache.

Device profiles are used to translate color data created on one device into another device's native color space. Each device profile enables a color management system with information necessary to convert or transform color data between a native device color space and a device independent color space. A color space is typically a particular model of colors, represented by a tri-dimensional map. There are three broad classes of devices, which are input devices, display devices, and output devices. For each device class, a series of base algorithm models describe a transformation between color spaces.

A typical color transformation requires four lookup tables for transfer functions and two lookup tables for under color removal and black generation. Each lookup table requires at least 256 bytes of memory for 8-bit. Therefore, a color transform requires at least 1.5 kilobytes of memory for the lookup tables required for the transfer functions, under color removal, and black generation. If a document processing job requires four thousand color transformations, six megabytes of memory for the transfer functions, under color removal, and black generation will be required. As such, multiple jobs, each having thousands of color transformations, will likely require all of the system memory and may eventually cause the system to crash. There is a need for a system and method to reduce the amount of memory required for transfer functions, under color removal, and black generation.

The subject invention overcomes the above-noted problems and provides a system and method for managing memory for color transforms.

SUMMARY OF THE INVENTION

In accordance with the present invention, there is provided a system and method for managing memory for color transforms.

Further, in accordance with the present invention, there is provided a system and method for reducing the amount of memory required for transfer functions, under color removal, and black generation.

Still further, in accordance with the present invention, there is provided a system and method for reducing the memory usage for color transforms by using a lookup table having an associated reference counter and a function cache.

Still further, in accordance with the present invention, there is provided a system for managing memory for color transforms. The system comprises means adapted for receiving color input data representative of a colorized electronic document. The system also includes a color analyzer having means adapted for analyzing the color input data. The system further includes means adapted for determining a plurality of desired color transforms in connection with an output of the color analyzer and means adapted for creating a plurality of lookup tables in an associated memory in accordance with a plurality of color transforms specified by analysis of the color input data. The system also comprises a counter corresponding to each lookup table and means adapted for selectively incrementing a value of a counter corresponding to a lookup table for each request for a related color transform. The system further comprises means adapted for selectively decrementing the counter value corresponding to a lookup table and means adapted for selectively clearing a lookup table in the associated memory when a corresponding counter value is decremented to a selected level.

Still further, in accordance with the present invention, there is provided a method for managing memory for color transforms. The method receives color input data representative of a colorized electronic document and then analyzes, via a color analyzer, the color input data. The method also determines a plurality of desired color transforms in connection with an output of the color analyzer and creates a plurality of lookup tables in an associated memory in accordance with a plurality of color transforms specified by analysis of the color input data. The method further includes the steps of selectively incrementing a value of a counter corresponding to a lookup table for each request for a related color transform, selectively decrementing the counter value corresponding to a lookup table, and selectively clearing a lookup table in the associated memory when a corresponding counter value is decremented to a selected level.

Still other objects and aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

This invention is directed to a system and method for managing memory for color transforms in digital imaging devices. The subject system is particularly applicable to transforms in print devices. However, it will be appreciated that the system is suitably applied to any color transform system, including displays, file translations, translations between applications, translations between operating systems, and the like. In particular, the present invention reduces the amount of memory required for transfer functions, under color removal, and black generation. More particularly, the present invention is directed to a system and method for reducing the memory usage for color transforms by using a lookup table having an associated reference counter and a function cache. In the preferred embodiment, as described herein, the application of the present invention is embodied in an image generating device, however other suitable image processing hardware, software, or any combination thereof, are equally capable of implementing the instant invention. In the preferred embodiment, described hereinafter, the image generating device is a multifunctional peripheral device, capable of providing scanning, copying, facsimile, printing, file management, file storage, electronic mail, and other functions to a user.

Figure 1:
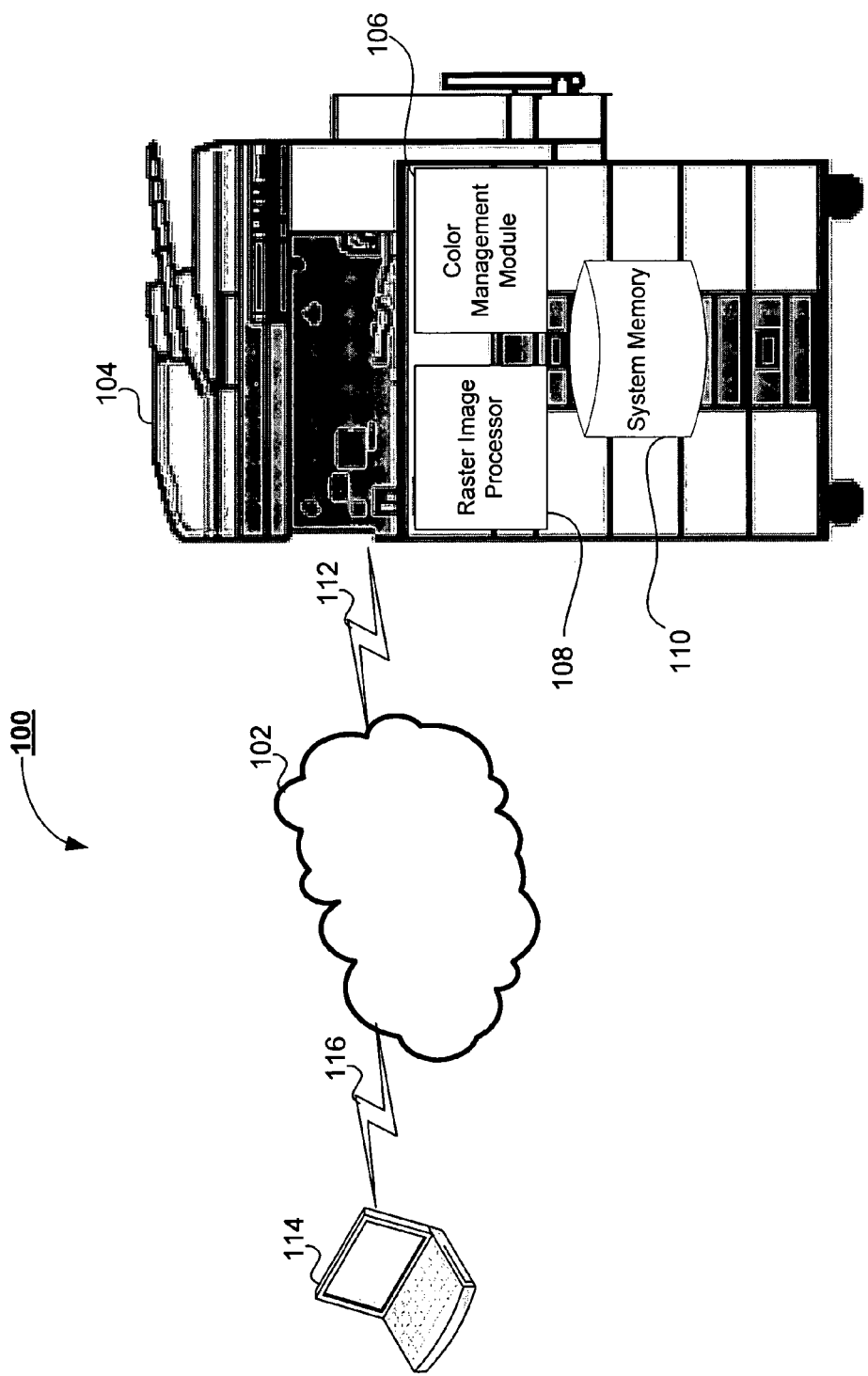
FIG. 1 is a block diagram of the system according to the present invention.

Turning now to FIG. 1, there is shown a block diagram illustrating a system 100 in accordance with the present invention. The system 100 is used herein for example purposes only and the instant invention is capable of implementation in a variety of computing environments, other than the network environment illustrated in FIG. 1. The system 100 is implemented using a distributed computing environment, shown as the computer network 102. It will be appreciated by those skilled it the art that the computer network 102 is any computer network known in the art capable of enabling communications between two or more electronic devices. As will be understood by those skilled in the art, the subject invention is capable of implementation over any suitable computer network, including, for example and without limitation, the Internet, an Ethernet-based network, a Token Ring based network, an intranet, a personal area network, a local area network, a wide area network, wireless, or any combination thereof. The subject invention is also suitably realized between processes or devices associated with a single device, such as a workstation, or a workstation with an associated digital imaging device.

The system 100 further includes an image generating device 104 suitably adapted to process color and monochromatic images. It will be understood by those skilled in the art that a suitable image generating device is illustrated in FIG. 1 as a multifunction peripheral device, suitably adapted to provide a variety of document processing operations, including, for example and without limitation, scanning, copying, printing, facsimile, gamma correction, electronic mail, storage, and the like. Suitable commercially available image generating devices include, for example and without limitation, the Toshiba e-Studio Series Controller. The image generating device 104 further includes a color management module 106 suitably adapted to allocate and release system memory 110 during image processing. As will be understood by those skilled in the art, the color management module 106 is further capable of, but is not limited to, generation and removal of color processing lookup tables, facilitation of under color removal, processing of color transformations, and the like. In accordance with one aspect of the present invention, the color management module 106 is implemented as a component of the raster image processor 108, which provides image rendering services for the image processing device 104. FIG. 1 illustrates the color management module 106 and the raster image processor 108 as separate components, however the skilled artisan will understand that the present invention is capable of implementing the hardware, software, or any combination thereof, with respect to these components, as a single piece of hardware, software, or combination thereof. In addition, the image generating device 104 further includes system memory 110, suitably adapted to provide memory for processing of by the image generating device 104. The skilled artisan will appreciate that the system memory 110 is capable of implementation as, but is not limited to, any volatile, non-volatile, virtual memory known in the art, including, for example RAM, Flash memory, ROM, magnetic storage devices, optical storage, or any combination thereof.

The image processing device 104 is in data communication with the computer network 102 via a suitable communications link 112. Preferably, the communications link 112 is any communications channel known in the art capable of allowing the exchange of voice, image, video, or text data. Suitable communications links include, for example and without limitation, Bluetooth, WiMax, infrared, optical, or any suitable wireless data transmission system, or wired communications known in the art. In one particular embodiment of the present invention, the image generating device 104 further includes a user-interface, advantageously enabling the direct interaction between the image generating device 104 and an associated user. Preferably, the user-interface is a touch-screen interface, however any suitable input/output means known in the art are capable of being used as a user-interface, including, for example and without limitation, an alphanumeric keypad, a function specific keypad, a mouse, an LCD, or any combination thereof. In a preferred embodiment of the present invention, the image generating device 104 is suitably equipped to receive a plurality of portable storage media, including without limitation, Firewire devices, USB devices, SD, MMC, XD, Compact Flash, Memory Stick, and the like. The skilled artisan will appreciate that the combination of the user-interface and the portable storage media enables an associated user to request image processing services without accessing the computer network 102.

The system 100 illustrated in FIG. 1 also includes at least one client device 114, shown as a laptop computer. The skilled artisan will appreciate that the depiction of the client device 114 as a laptop computer is for example purposes only, and the client device 114 is capable of being implemented as any personal electronic device known in the art capable of communication with the image generating device 104 via the computer network 102. For example and without limitation, suitable client devices include web-enabled cellular telephones, personal data assistants, personal computers, and the like. The client device 114 communicates with the computer network 102 via the communications link 116. As will be understood by the skilled artisan, the communications link 116 is any communications channel known in the art, including, for example and without limitation, infrared, optical, WiMax, 802.11a, 802.11b, 802.11g, 802.11(x), Bluetooth, or any suitable wireless data transmission system or wired communications known in the art.

In operation, the image generating device 104 receives an image processing request from an associated user of the client device 114, from an associated user via the user-interface, or the like. Preferably, the image processing request includes data representative of a color electronic document for processing by the image processing device 104. It will be appreciated by those skilled in the art that the image processing device 104 enables an associated user to initiate an image processing request via the associated user-interface wherein the color document to be processed is an electronic document from a portable storage media, a hardcopy to be scanned to generate an electronic document, an electronic document stored at a remote location that is retrieved by the image generating device 104, an electronic file attached to an electronic mail message, and the like. Irrespective of the origination of the original electronic document, the image processing device 104, via the color management module 106, analyzes the received color processing request and determines the color transformations associated therewith. The skilled artisan will appreciate that as used herein, a color transformation denotes the transformation of color data between a native device color space and a device independent color space.

It will be understood by those skilled in the art that a given color document processing request is capable of including a plurality of associated color transformations. A transform of the preferred embodiment incorporates Adobe Systems Incorporated PostScript® functions. However, it will be appreciated that the subject invention is suitably applied to any transformation as will be appreciated by one of ordinary skill in the art. The color management module 106 retrieves the first color transformation and determines whether or not a lookup table, as required by the transform, already exists in system memory 110. When a lookup table is located, a determination is then made as to whether or not the PostScript® function associated with the color transformation matches the PostScript® function stored in a PostScript® function cache associated with the lookup table. When the function received with the color document processing matches that of contained within the cache associated with the lookup table, a reference counter is incremented by one to indicate that at least one color transformation is using the lookup table. When the functions do not match, the color management module 106 allocates a portion of the system memory 110 for use by a lookup table associated with the color transformation. The lookup table is then generated in the system memory 110 using the color transformation and a reference counter is incremented to reflect that at least one color transformation requires the lookup table for processing. The PostScript® function is then stored in a PostScript® function cache associated with the lookup table in system memory 10. This process is repeated for each additional color transformation and/or lookup table required by a color transformation.

For example, a given color transformation is capable of requiring four lookup tables for processing the transfer function and two additional lookup tables corresponding to under color removal and black generation, respectively. In accordance with the present invention, the color management module 106 analyzes the color transformation and determines whether the first lookup table associated therewith, is already present in system memory 110. When, for example, a previous processing request required generation of a lookup table which matches the lookup table needed by the current processing request, the color management module 106 determines whether or not the PostScript® function stored in the lookup table PostScript® cache matches the PostScript® function associated with the received image processing request. When these functions match, the same lookup table is capable of being used by both color processing requests, and the color management module 106 is not required to allocate system memory 110 to store a new lookup table. Rather the color management module 106 simply increments a reference counter associated with the lookup table to reflect that an additional transform, i.e., the current processing request, is using the table. This process is repeated for each of the remaining three transfer functions and for the under color removal and black generation lookup tables. The skilled artisan will appreciate the reduction in required memory the preceding invention enables.

When no lookup table is already in existence in system memory 110, or when the PostScript® cache of the discovered lookup table fails to match the PostScript® function accompanying the processing request, system memory 110 is allocated by the color management module 106 for subsequent use by a lookup table. The color management module 106 then generates a lookup table in the allocated memory 110. A reference counter corresponding to the newly generated lookup table is then incremented by a value of one to reflect the use of the table by the associated transfer function. The PostScript® function associated with the table is then stored in a PostScript® cache associated with the lookup table. Those skilled in the art will appreciate that the storage of the PostScript® function in a cache associated with the lookup table enables the color management module 106 to quickly analyze the table and determine whether the contents of the table match what would be generated by the PostScript® function received with the current processing request.

In accordance with one aspect of the present invention, the reference counter associated with each lookup table resident in the system memory 110 is suitably decremented following the completion of a transform associated therewith. Thus, once a particular transfer function associated with a lookup table has finished using the data contained therein, i.e., the color processing request no longer requires the use of the lookup table, the reference counter is lowered by a value of one. When the value of the reference counter reaches zero, that is no functions are calling the table to facilitate color processing operations, the color management module 106 of the present invention is advantageously adapted to enable an administrator to predetermine when the lookup table is to be deleted from system memory 110. Thus, the shared lookup tables are deleted by the color management module 106 following the occurrence of a predetermined event. In one embodiment, the color management module 106 initiates a delete transform command following a determination that a predetermined period of time has elapsed following the reference counter having been decremented to a zero value. In another embodiment, the color management module 106 initiates a delete transform command following completion of the last color processing request calling to that table, i.e., immediately upon the reference counter reaching zero. In one embodiment, the color management module 106 initiates a delete command upon a determination that the system memory 110 has exceeded a predetermined threshold of usage and additional memory is required to complete color processing requests. When such a determination is made, the color management module 106 deletes those lookup tables having zero values in their respective reference counters. When no such determination is made, the system memory 110 maintains those lookup tables, so as to enable subsequent color processing requests to make use of the tables, instead of having to reallocate and regenerate the tables for use in color processing.

Figure 2:
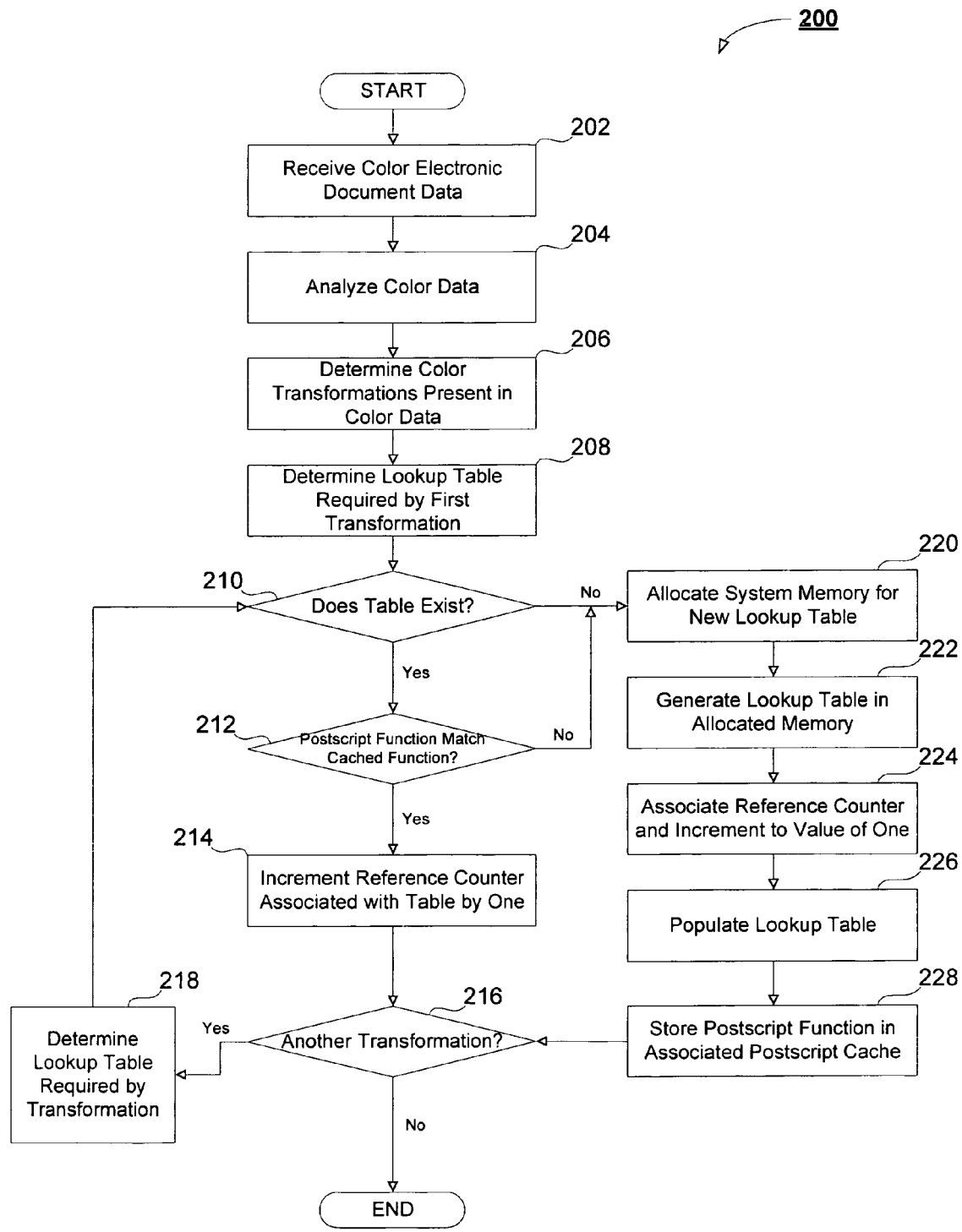
FIG. 2 is a flowchart illustrating a method for managing memory for color transforms according to the present invention.

The preceding examples of a system in accordance with the present invention will better be understood in conjunction with the flowchart shown in FIG. 2 and FIG. 3, discussed hereinafter. Referring now to FIG. 2, there is shown a flowchart 200 illustrating a method for managing memory for color transformations in accordance with the present invention. The method begins at step 202 with the receipt of color electronic document data by the image generating device 104. Preferably, the document data is forwarded to the color management module 106, which facilitates the color conversions and processing of the electronic document. The color management module 106 then analyzes the color document data at step 204. At step 206, the color management module 106 suitably determines the color transformations present in the color electronic document data. The skilled artisan will appreciate that as used herein, a color transformation denotes the transformation of color data between a native device color space and a device independent color space.

The color management module 106 then determines the lookup table required by the first color transformation at step 208. It will be appreciated by those skilled in the art that a color transformation is capable of requiring a plurality of lookup tables and the instant method described in FIG. 2 denotes the generation and management of a single lookup table corresponding to each color transformation for purposes of explanation only. The skilled artisan will understand that the method as illustrated in FIG. 2 is performed for each lookup table required by the color transformation prior to proceeding to the next color transformation needed to complete the color processing of the electronic document by the image generating device 104. The color management module 106 then determines, at step 210, whether the lookup table required by the color transformation already exists in the system memory 110. That is, the color management module 106 queries the system memory 110 to determine if a previous color transformation, from the current electronic document or from a previous electronic document, that corresponds to the current color transformation is already present in the system memory 110. When a lookup table is located, flow proceeds to step 212.

At step 212, a determination is made by the color management module 106 whether the existing lookup table is capable of being used by the current color transformation. That is, the color management module 106 compares a PostScript® function contained within the current color transformation with the function stored in a PostScript® cache associated with the lookup table. It will be understood by those skilled in the art that the PostScript® function is advantageously used to facilitate the conversion from one color space to another color space. When the PostScript® functions match, that is, the data already present in the lookup table is identical to the data that would be generated by the PostScript® function contained within the current transformation, flow proceeds to step 214, whereupon a reference counter, denoting the number of color transformations using the lookup table, is incremented by a value of one. In one embodiment, the color management module 106 determines whether the value of the reference counter has exceeded a predetermined threshold value and upon such a determination, does not increment the counter an additional value of one, but continues on to step 216. A determination is then made at step 216 whether additional color transformations are required to process the electronic document. When no additional color transformations remain, the document is ready for rendering and output by the image generating device 104. When additional color transformations remain associated with the color electronic document, flow proceeds to step 218, whereupon the color management module 106 determines the lookup table required by the next color transformation. Flow then returns to step 210 for a determination on whether the determined lookup table is already present in the system memory 110.

When the PostScript® functions do not match at step 212, flow proceeds to step 220, whereupon the color management module 106 allocates a portion of system memory 110 for use for a new lookup table corresponding thereto. The color management module 106 then generates a new lookup table in the allocated system memory 110 at step 222. A reference counter associated with the new lookup table is then generated and incremented by a value of one at step 224, denoting that one color transformation is active and associated with the lookup table. At step 226, the lookup table is populated by the color management module 106 using any color lookup table generating means known in the art and applicable to the electronic document data. The PostScript® function is then stored, at step 228, in a PostScript® cache associated with the lookup table. Flow then proceeds to step 216, whereupon a determination is made whether any additional color transformations remain for processing. When no additional transformations remain, the operation terminates and the image generating device 104 is able to output the color electronic document data.

Figure 3:
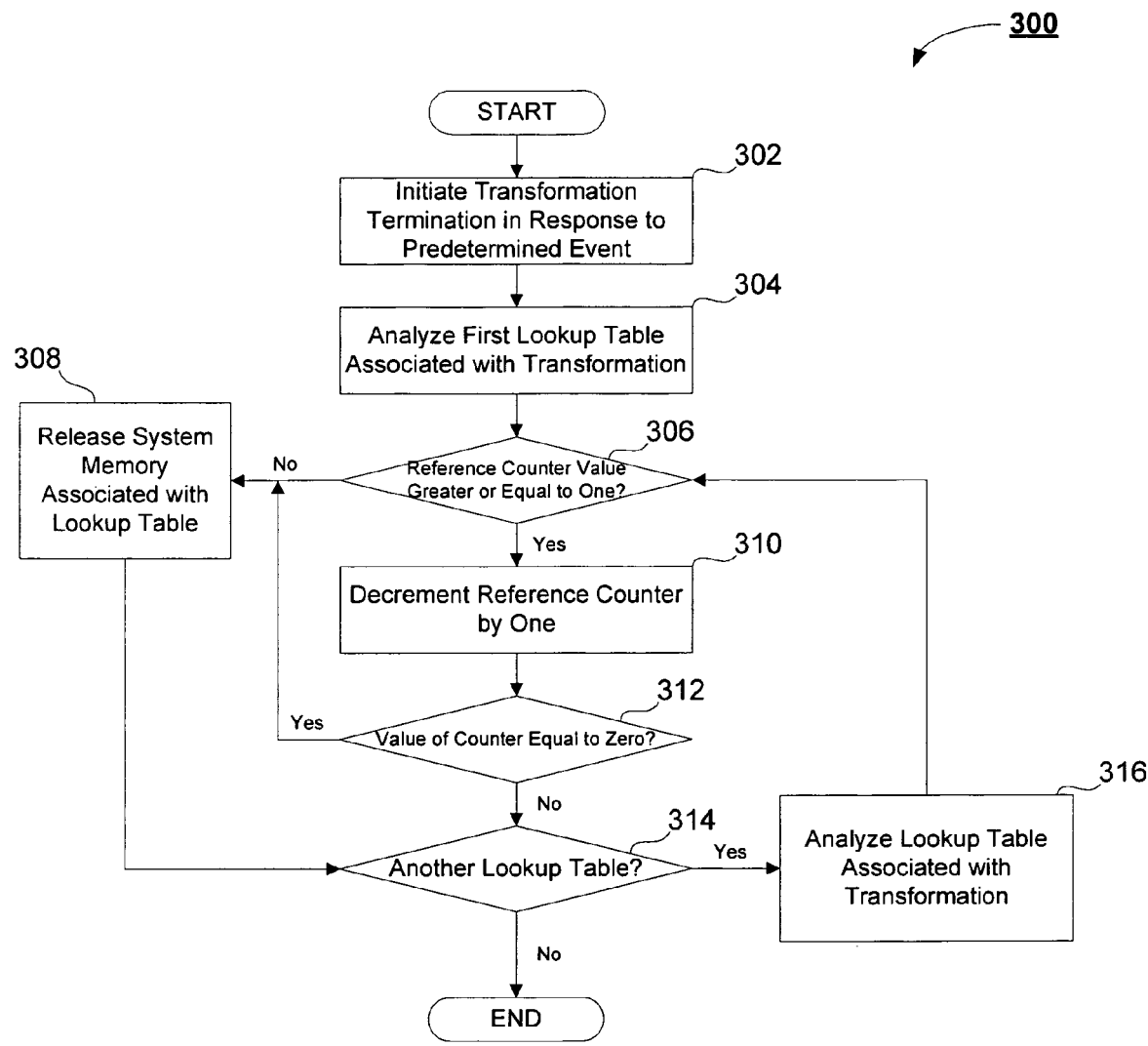
FIG. 3 is a flowchart illustrating a method for managing memory for color transforms according to the present invention.

Turning now to FIG. 3, there is shown a flowchart 300 illustrating a method for decrementing and deleting lookup tables from system memory 110 in accordance with the present invention. At step 302, the color management module 106 initiates a transformation termination in response to the occurrence of a predetermined event. In accordance with one embodiment of the present invention, the predetermined event is the completion of the color processing request to which the color transformation is associated. In another embodiment, the predetermined event is the determination by the color management module 106 that system memory 110 is needed for other processing operations. In one particular embodiment, a determination is made by the color management module 106 that a predetermined period of time has elapsed following the decrementing of the reference counter associated with a particular lookup table. In another embodiment, the predetermined event is the determination that the reference counter is zero and the system memory 110 is required for additional processing operations. Irrespective of the triggering event described above, the decrementing and analysis shown in FIG. 3 is performed by the color management module 106.

At step 304, the first lookup table associated with the color transformation being terminated is analyzed. A determination is then made by the color management module 106 at step 306 whether the reference counter has a value greater than or equal to one. When the value of the reference counter is greater than or equal to one, flow proceeds to step 310, whereupon the value of the reference counter is decremented by a value of one. A determination is then made at step 312 whether the decremented value of the reference counter is now equal to zero. That is, at step 312 the color management module 106 determines whether the new value of the reference counter is zero, denoting that no color transformations require the lookup table for processing. When the value of the counter is equal to zero, flow proceeds to step 308, whereupon the system memory 110 associated with the lookup table is released, i.e., the lookup table is deleted. Flow then proceeds to step 314, whereupon a determination is made whether additional lookup tables remain in system memory 110 which are associated with the terminated color transformation. When additional lookup tables remain, flow proceeds to step 316, wherein the next lookup table associated with the color transformation is analyzed and subjected to the determination of reference counter value at step 306.

Returning to step 312, when it is determined that the decremented value of the reference counter associated with the lookup table is still greater than one, i.e., not equal to zero, flow proceeds to step 314, whereupon a determination is made whether or not additional lookup tables associated with the terminated color transformation remain in system memory 110. When additional tables remain, operations proceed to step 316, wherein the next lookup table associated with the terminated color transformation is analyzed and subjected to the determination as to reference counter value at step 306. When it is determined at step 306 that the reference counter value is not greater than or equal to one, flow proceeds to step 308, whereupon the system memory 110 associated with the lookup table is released for other operations. The method then returns to step 314 to determine whether any additional lookup tables associated with the terminated color transformation remain in system memory 110. When no additional tables remain associated with the color transformation, the decrementing and deleting operations of FIG. 3 terminate.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical, electromagnetic, or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A memory management system for color transforms comprising:
   means adapted for receiving color input data representative of a colorized electronic document;
   a color analyzer, the color analyzer including means adapted for analyzing the color input data;
   means adapted for determining a plurality of desired color transforms in connection with an output of the color analyzer;
   means adapted for creating a plurality of lookup tables in an associated memory in accordance with a plurality of color transforms specified by analysis of the color input data;
   a counter corresponding to each lookup table;
   means adapted for selectively incrementing a value of a counter corresponding to a lookup table for each request for a related color transform;
   means adapted for selectively decrementing the counter value corresponding to a lookup table; and
   means adapted for selectively clearing a lookup table in the associated memory when a corresponding counter value is decremented to a selected level.

2. The memory management system for color transforms of claim 1 further comprising means adapted for selectively reusing a lookup table in the memory when a corresponding counter has not yet been decremented to the selected level.

3. The memory management system for color transforms of claim 1 wherein at least one lookup table includes a function cache associated with a corresponding color transform.

4. The memory management system for color transforms of claim 3 wherein the function cache stores transform data used to populate at least a portion of a corresponding lookup table.

5. The memory management system for color transforms of claim 1 wherein at least one lookup table includes a storage for at least one of under color removal and black generation.

6. The memory management system for color transforms of claim 1 further comprising means adapted for monitoring available memory for lookup table usage, and means adapted for clearing lookup table memory associated with a transform having a lowest counter level when available memory is insufficient to store an additional needed lookup table.

7. The memory management system for color transforms of claim 1 wherein the value of a counter corresponding to a lookup table for each request for a related color transform is incremented to a selected maximum value, wherein further requests for a related color transform do not further increment the value of the counter.

8. A method for managing memory for color transforms comprising the steps of:
   receiving, into a computer including associated memory, color input data representative of a colorized electronic document;
   analyzing, via a color analyzer, the color input data;
   determining a plurality of desired color transforms in connection with an output of the color analyzer;
   creating a plurality of lookup tables in an associated memory in accordance with a plurality of color transforms specified by analysis of the color input data;
   selectively incrementing a value of a counter corresponding to a lookup table for each request for a related color transform;
   selectively decrementing the counter value corresponding to a lookup table; and
   selectively clearing a lookup table in the associated memory when a corresponding counter value is decremented to a selected level.

9. The method for managing memory for color transforms of claim 8 further comprising the step of selectively reusing a lookup table in the memory when a corresponding counter has not yet been decremented to the selected level.

10. The method for managing memory for color transforms of claim 8 wherein at least one lookup table includes a function cache associated with a corresponding color transform.

11. The method for managing memory for color transforms of claim 10 wherein the function cache stores transform data used to populate at least a portion of a corresponding lookup table.

12. The method for managing memory for color transforms of claim 8 further comprising the step of storing at least one of under color removal and black generation in a storage associated with the lookup tables.

13. The method for managing memory for color transforms of claim 8 further comprising the steps of monitoring available memory for lookup table usage, and clearing lookup table memory associated with a transform having a lowest counter level when available memory is insufficient to store an additional needed lookup table.

14. The method for managing memory for color transforms of claim 8 wherein the value of a counter corresponding to a lookup table for each request for a related color transform is incremented to a selected maximum value, wherein further requests for a related color transform do not further increment the value of the counter.

* * * * *